United States Patent
Shintani

(10) Patent No.: US 11,452,918 B2
(45) Date of Patent: Sep. 27, 2022

(54) BALANCE TRAINING SYSTEM, CONTROL METHOD, AND PROGRAM

(71) Applicant: Toyota Jidosha Kabushiki Kaisha, Toyota (JP)

(72) Inventor: Kazuhiro Shintani, Toyokawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 327 days.

(21) Appl. No.: 16/810,168

(22) Filed: Mar. 5, 2020

(65) Prior Publication Data
US 2020/0289894 A1 Sep. 17, 2020

(30) Foreign Application Priority Data

Mar. 15, 2019 (JP) .............................. JP2019-047893

(51) Int. Cl.
*A63B 26/00* (2006.01)
*A63B 71/06* (2006.01)
*A61H 1/00* (2006.01)

(52) U.S. Cl.
CPC .......... *A63B 26/003* (2013.01); *A61H 1/001* (2013.01); *A61H 1/005* (2013.01);
(Continued)

(58) Field of Classification Search
CPC .......... A61H 1/00; A61H 1/001; A61H 1/005; A61H 2201/1635; A61H 2201/1669; A61H 2203/0406; A61H 2230/625; A63B 24/0003; A63B 24/0006; A63B 24/0062; A63B 24/0087; A63B 2024/0012; A63B 2024/0068; A63B 2024/0093; A63B 26/00; A63B 26/003; A63B 71/0054; A63B 71/0619; A63B 71/0622; A63B 2071/065; A63B 2071/0658; A63B 2071/0675;
(Continued)

(56) References Cited

U.S. PATENT DOCUMENTS 9,526,946 B1    12/2016  Zets et al.
10,376,734 B1 *  8/2019  Razon ................. A61B 5/0077
(Continued)

FOREIGN PATENT DOCUMENTS

CN    108371806 A  *  8/2018  ............. A63B 69/00
FR       2974731 A1 * 11/2012  ............. A61H 1/005
(Continued)

*Primary Examiner* — Gary D Urbiel Goldner
(74) *Attorney, Agent, or Firm* — Dinsmore & Shohl LLP

(57) ABSTRACT

A training system includes a riding plate, a load sensor, a first center of gravity calculation unit, an image-capturing unit, a second center of gravity estimation unit, and a determination unit. The load sensor detects a load that the riding plate receives from a trainee. The first center of gravity calculation unit calculates a first center of gravity, which is a center of gravity of a load, based on the load detected by the load sensor. The image-capturing unit acquires image data of an image including a posture of the trainee. The second center of gravity estimation unit estimates a second center of gravity, which is a centroid position of the trainee, based on the image data. The determination unit determines that an alert to the trainee should be output based on a difference between the first center of gravity and the second center of gravity.

9 Claims, 14 Drawing Sheets

(52) U.S. Cl.
CPC .. *A63B 71/0622* (2013.01); *A61H 2201/1635* (2013.01); *A61H 2201/1669* (2013.01); *A61H 2203/0406* (2013.01); *A61H 2230/625* (2013.01); *A63B 2071/0694* (2013.01); *A63B 2208/0204* (2013.01); *A63B 2220/05* (2013.01); *A63B 2220/52* (2013.01); *A63B 2220/833* (2013.01)

(58) Field of Classification Search
CPC .... A63B 2071/0677; A63B 2071/0683; A63B 2071/0694; A63B 2208/0204; A63B 2220/05; A63B 2220/20; A63B 2220/24; A63B 2220/30; A63B 2220/40; A63B 2220/50; A63B 2220/51; A63B 2220/52; A63B 2220/80; A63B 2220/807; A63B 2220/83; A63B 2220/833; A63B 2225/50; A63B 2230/01; A63B 2230/015; G06T 7/66; G06T 2207/10016; G06T 2207/30196
See application file for complete search history.

(56) References Cited

U.S. PATENT DOCUMENTS

| | | | | |
|---|---|---|---|---|
| 2008/0004550 | A1* | 1/2008 | Einav | A61H 1/0296 601/33 |
| 2021/0245010 | A1* | 8/2021 | Shintani | A63B 22/02 |

FOREIGN PATENT DOCUMENTS

| | | | | | |
|---|---|---|---|---|---|
| FR | 2997631 | A1 | * | 5/2014 | A63B 22/02 |
| JP | 3720768 | B2 | * | 11/2005 | A61B 5/1124 |
| JP | 2009232942 | A | * | 10/2009 | A63B 22/02 |
| JP | 2014159223 | A | * | 9/2014 | |
| JP | 2015-100477 | A | | 6/2015 | |
| JP | 6795190 | B2 | * | 12/2020 | A61B 5/1116 |
| KR | 20170062826 | A | * | 6/2017 | A61B 5/1124 |
| KR | 20180009472 | A | * | 1/2018 | A61H 23/02 |
| WO | WO-2008034965 | A1 | * | 3/2008 | G01G 19/44 |
| WO | WO-2011135274 | A1 | * | 11/2011 | A61H 1/005 |
| WO | WO-2014072662 | A2 | * | 5/2014 | A63B 22/02 |
| WO | WO-2016032027 | A1 | * | 3/2016 | A61B 5/11 |
| WO | WO-2018016765 | A1 | * | 1/2018 | A61H 23/02 |

\* cited by examiner

| ID | DATE AND TIME OF EXECUTION START | TASK NUMBER | EVALUATION | ALERT | ... |
|---|---|---|---|---|---|
| 0021 | 201903091524 | #020 | C | 0 | |
| 0022 | 201903091602 | #023 | A | 1 | |
| 0023 | 201903091618 | #023 | B | 0 | |
| ... | ... | ... | ... | ... | |

Fig. 10

BALANCE TRAINING SYSTEM, CONTROL METHOD, AND PROGRAM

CROSS REFERENCE TO RELATED APPLICATIONS

This application is based upon and claims the benefit of priority from Japanese patent application No. 2019-047893, filed on Mar. 15, 2019, the disclosure of which is incorporated herein in its entirety by reference.

BACKGROUND

The present disclosure relates to a balance training system, a control method, and a program.

Balance training apparatuses, which assist rehabilitation of patients who have disabilities in their legs, have been developed. For example, an, apparatus for moving a riding plate (a force plate) in a direction that is the same as or opposite to a direction in which the center of gravity of a trainee who is standing on a riding plate moves to improve a sense of balance of the trainee has been developed.

A balance training apparatus disclosed in Japanese Unexamined Patent Application Publication No. 2015-100477 includes a load detection sensor configured to detect a load applied to a force plate, centroid position detection means for detecting a centroid position of a trainee from the load applied to the load detection sensor, and driving means for moving the force plate in a horizontal direction. This balance training apparatus moves the force plate in accordance with the movement of the centroid position of the trainee.

SUMMARY

The aim of the balance training apparatus disclosed in Japanese Unexamined Patent Application Publication No. 2015-100477 is to improve the sense of balance of the trainee during walking by performing training of a centroid movement of the lower limb of the trainee. However, the trainee may sometimes move his/her upper limb on the balance training apparatus or may lean on a surrounding structure in order to keep his/her balance. Further, the trainee may sometimes lift his/her sole from the force plate in order to keep his/her physical balance. When the trainee continues to perform training in these unfavorable conditions, effects of the training may be reduced.

The present disclosure has been made in order to solve the aforementioned problem, and provides a balance training apparatus and the like capable of providing efficient training.

A balance training apparatus according to a first aspect of the present disclosure includes a riding plate, a load sensor, a first center of gravity calculation unit, an image-capturing unit, a second center of gravity estimation unit, and a determination unit. The riding plate has a placement surface that supports the sole of the trainee who is standing. The load sensor detects a load that the riding plate receives from the trainee. The first center of gravity calculation unit calculates a first center of gravity, which is a center of gravity of the load, based on the load detected by the load, sensor. The image-capturing unit acquires image data of an image including a posture of the trainee. The second center of gravity estimation unit estimates a second center of gravity, which is a centroid position of the trainee, based on the image data. The determination unit determines that the alert to the trainee should be output based on the difference between the first center of gravity and the second center of gravity.

According to the aforementioned configuration, the balance training apparatus may alert the trainee to perform training with a correct posture when the difference between the center of gravity estimated from the posture of the trainee and the center of gravity of the load received from a foot of the trainee standing on the moving cart 110 is large.

The aforementioned balance training apparatus may further include a display unit that is installed in such a way that it can be visually seen by the trainee and a display controller, in which the display controller may cause the display unit to display a message to alert the trainee. Accordingly, the balance training apparatus is able to efficiently alert the trainee during the training.

The aforementioned balance training apparatus may further include an angle detection unit configured to detect an angle between the sole of the trainee and the placement surface from a posture of the trainee, in which the determination unit may determine that the alert should be output when the angle is larger than a predetermined threshold regardless of the difference between the first center of gravity and the second center of gravity. Accordingly, the balance training apparatus is able to alert the trainee by simple processing.

The aforementioned balance training apparatus may further include a driving unit configured to drive the riding plate at a predetermined speed, an acceleration, or a moving distance in accordance with a change in the first center of gravity; and a movement controller configured to control the driving unit, in which the movement controller may adjust the speed, the acceleration, or the moving distance based on the difference between the first center of gravity and the second center of gravity. Further, the aforementioned balance training apparatus may further include a moving cart capable of moving on a moving surface by driving the driving unit, in which the riding plate may be placed on the moving cart. Accordingly, the balance training apparatus is able to provide efficient training with less feeling of strangeness for the trainee.

The aforementioned balance training apparatus may further include a storage unit configured to store results of the training performed by the trainee, in which the storage unit may include data regarding whether the alert has been output in the results of the training. Further, the aforementioned storage unit may store the results of the training when the alert has not been output during the training. Accordingly, it is possible to select preferable data as an evaluation of the training.

A control method according to a second aspect of the present disclosure is a method of controlling a balance training apparatus for allowing a trainee standing, on a riding plate to perform balance training, the method including a detection step, a first center of gravity calculation step, an image-capturing step, a second center of gravity estimation step, and a determination step. The detection step detects a load that the riding plate receives from the trainee. The first center of gravity calculation step calculates a first center of gravity, which is a center of gravity of a load, based on the detected load. The image-capturing step acquires image data of an image including a posture of the trainee. The second center of gravity estimation step estimates a second center of gravity, which is a center of gravity of the trainee, based on the image data. The determination step determines that the alert to the trainee should be output based on the difference between the first center of gravity and the second center of gravity.

According to the aforementioned configuration, with the control method, it is possible to alert, when the difference between the center of gravity estimated from the posture of the trainee and the center of gravity of the load received from the foot of the trainee standing on the moving cart 110 is large, the trainee to perform training with a correct posture.

A program according to a third aspect of the present disclosure is a program for causing a computer to execute a method of controlling a balance training apparatus for allowing a trainee standing on a riding plate to perform balance training. The aforementioned control method, includes a detection step, a first center of gravity calculation step, an image-capturing step, a second center of gravity estimation step, and a determination step. The detection step detects a load that the riding plate receives from the trainee. The first center of gravity calculation step calculates a first center of gravity, which is a center of gravity of a load, based on the detected load. The image-capturing step acquires image data of an image including a posture, of the trainee. The second center of gravity estimation step estimates a second center of gravity, which is a center of gravity of the trainee, based on the image data. The determination step determines that the alert to the trainee should be output based on the difference between the first center of gravity and the second center of gravity.

According to the aforementioned configuration, the program is able to alert, when the difference between the center of gravity estimated front the posture of the trainee and the center of gravity of the load received from a foot of the trainee standing on the moving cart 110 is large, the trainee to perform training with a correct posture.

According to the present disclosure, it is possible to provide a balance training apparatus and the like capable of providing efficient training.

The above and other objects, features and advantages of the present disclosure will, become more fully understood from the detailed description given hereinbelow and the accompanying drawings which are given by way of illustration only, and thus are not to be considered as limiting the present disclosure.

BRIEF DESCRIPTION OF DRAWINGS

FIG. 10 is a diagram showing an example of training data generated by training in the training apparatus;

DETAILED DESCRIPTION

Hereinafter, the present disclosure will be explained with reference to embodiments of the present disclosure. However, the disclosure set forth in the claims is not limited to the following embodiments. Further, not all the structures explained in the embodiments may be necessary as means for solving the problem.

First Embodiment

Figure 1:
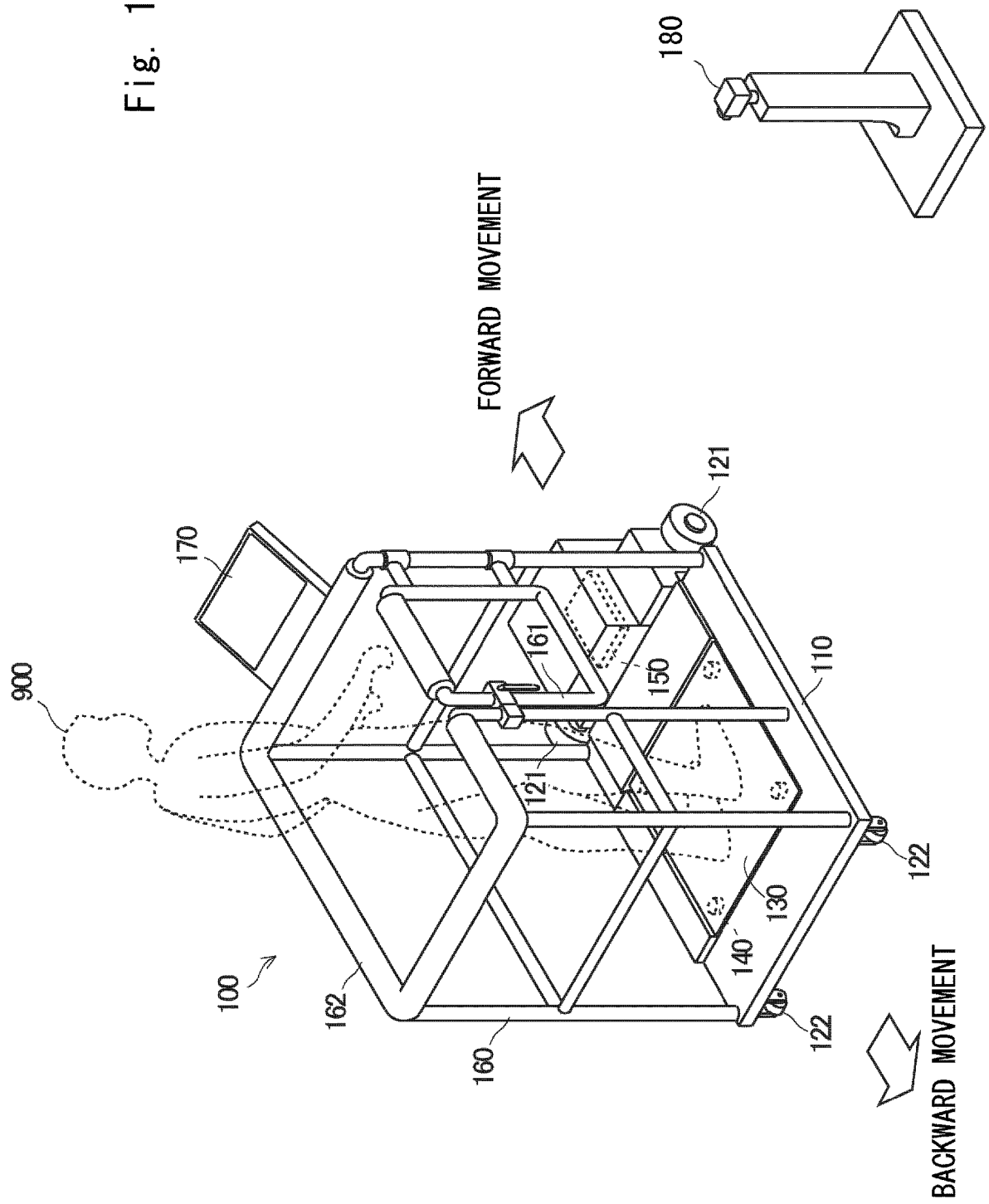
FIG. 1 is a schematic perspective view of a training apparatus according to a first embodiment.

FIG. 1 is a schematic perspective view of a training apparatus 100, which is one example of a balance training apparatus according to this embodiment. The training apparatus 100 is an apparatus for enabling a disabled person having a disability such as hemiplegia to learn a centroid movement that is necessary for walking or enabling a patient who has a disability in his/her ankle joint to recover an ankle joint function. When, for example, a trainee 900 who desires to recover the ankle joint function continues to ride the training apparatus 100 while balancing himself/herself, the training apparatus 100 is able to give the ankle joint of the trainee 900 a load that can be expected to achieve rehabilitation effects.

The training apparatus 100 includes a moving cart 110 that can move on a moving surface, which is a floor surface or the like of a rehabilitation, facility, in the front-back direction, and a frame 160 that is installed in the moving cart 110 and prevents the trainee 900 who rides the moving cart 110 from falling off. Farther, the training apparatus 100 includes an image-capturing unit 180 installed in a position located away from the moving cart 110. The moving cart 110 mainly includes driving wheels 121, casters 122, a riding plate 130, load sensors 140, and a control box 150.

The driving wheels 121 are provided as two front wheels with respect to the traveling direction. The driving wheels 121, which are rotationally driven by a motor (not shown) provided as a driving unit, move the moving cart 110 forward or backward. The casters 122, which are trailing wheels, are provided as two rear wheels with respect to the traveling direction.

The riding plate 130 is a riding part where the trainee 900 rides and puts his/her feet. The riding plate 130 is a rectangular flat plate made of, for example, polycarbonate resin having a relatively high rigidity that can withstand riding of the trainee 900. The riding plate 130 is supported on the upper surface of the moving cart 110 via the load sensors 140 arranged at four corners of the riding, plate 130.

The load sensors 140, which are, for example, load, cells, function as detection units configured to detect loads received from the feet of the trainee 900 who is standing on the moving cart 110. The load sensors 140, which are provided at the four corners of the riding plate 130, support the riding plate 130. The control box 150 accommodates an operation processing unit and a memory that will be described later.

The frame 160 includes an opening/closing door 161 and a handrail 162. The opening/closing door 161 is opened when the trainee 900 rides the riding plate 130 and forms a passage where the trainee 900 passes. When the trial of the training is performed, the opening/closing, door 161 is closed and locked. The handrail 162 is provided so as to surround the trainee 900 so that the trainee 900 is able to hold the handrail 162 when he/she is about to lose his/her balance or when he/she feels unsafe. The frame 160 supports a display panel 170. The display panel 170, which is, for example, a display unit such as a liquid crystal panel, is provided in a position where the trainee 900 can easily see it during the trial of the training.

The image-capturing unit 180 is a measurement sensor configured to capture an image of the entire body of the trainee and the moving cart 110 during the training, acquire image data including distance information, and supply the acquired image data to the control box 150. The image-capturing unit 180 is provided to capture an image of, for example, the side surface of the trainee in such a way that the center of gravity of the trainee can be estimated from the image data. The image-capturing unit 180 also includes a radio communication apparatus for sequentially transmitting the image data to the control box 150.

Figure 2:
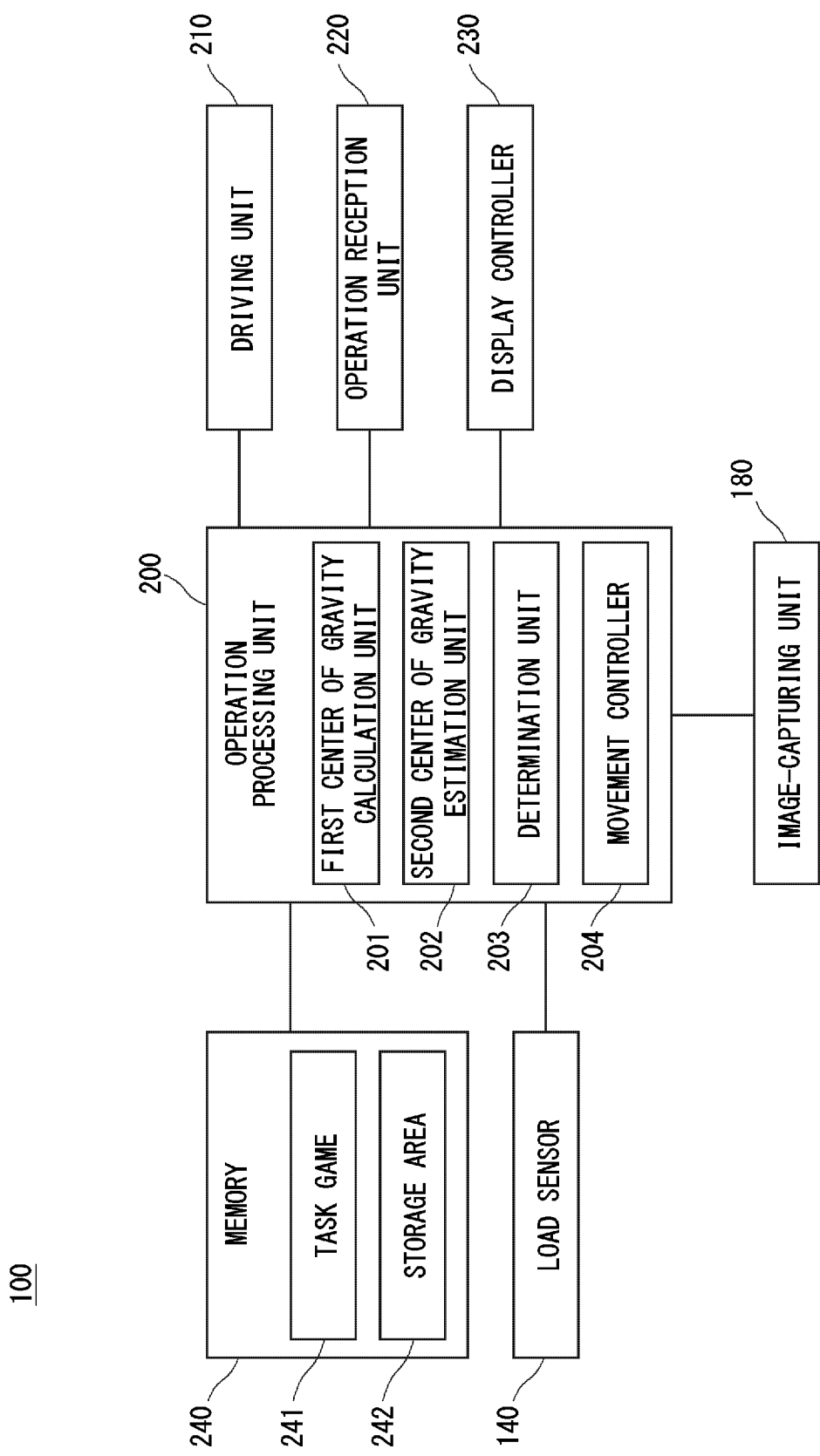
FIG. 2 is a diagram showing a system configuration of the training apparatus according to the first embodiment.

FIG. 2 is a diagram showing a system configuration of the training apparatus 100. The training apparatus 100 includes, as a system configuration, an operation processing unit 200, a driving unit 210, an operation reception unit 220, a display controller 230, a memory 240, a load sensor 140, and an image-capturing unit 180.

The operation processing unit 200, which is, for example, a Micro Processing Unit (MPU), executes control of the entire apparatus by executing a control program loaded from the memory 240. Further, the operation processing unit 200 stores results of the executed training in the memory 240. The operation processing unit 200 also serves as a function execution unit configured to execute various operations and control of individual elements in accordance with a request from the control program. The operation processing unit 200 includes a first center of gravity calculation unit 201, a second center of gravity estimation unit 202, a determination unit 203, and a movement controller 204.

The first center of gravity calculation unit 201 acquires detection signals of the four load sensors 140 and calculates the center of gravity of the loads of the respective feet of the trainee 900 on the riding surface. More specifically, since the respective positions of the four load sensors 140 are known, the centroid position is calculated from the distribution of the loads in the vertical direction detected by the respective load sensors 140, and this position is set as the first center of gravity.

The second center of gravity estimation unit 202 acquires image data from the image-capturing unit 180, analyzes the posture of the trainee from the acquired image data, and estimates the second center of gravity, which is the centroid position of the trainee from the posture of the trainee that has been analyzed. The second center of gravity estimation unit 202 may store a database of, for example, the mass of the skeleton, and the height and the weight of the trainee in advance, and estimate the center of gravity by comparing the build of the trainee estimated from the image data with the database.

The determination unit 203 determines that a message such as a predetermined alert should be output to the trainee during the training. The predetermined alert is a message for encouraging the trainee to take a correct posture when, for example, the posture of the trainee does not comply with the content of the training in the trial. In order to determine whether this message should be output, the determination unit 203 calculates the difference between the first center of gravity and the second center of gravity and compares the calculated difference between the first center of gravity and the second center of gravity with a predetermined threshold, to thereby determining that the alert to the trainee should be output.

The movement controller 204 generates a driving signal to be transmitted to the driving unit 210 and controls the movement of the moving cart 110 via the driving unit 210. The driving signal is, for example, a signal for instructing the driving unit 210 to move at a predetermined speed or a predetermined acceleration in accordance with a change in the first center of gravity. The driving signal may be a signal for instructing the driving unit 210 to move a predetermined distance in accordance with a change in the first center of gravity.

The operation reception unit 220 accepts an input operation from the trainee 900 or an operator and transmits an operation signal to the operation processing unit 200. The trainee 900 or the operator operates an operation button provided in the apparatus, a touch panel overlapped with the display panel 170, an attached remote control or the like that form the operation reception unit 220, thereby turning on/off the power supply, giving an instruction for starting the trial of the training, inputting numerical values regarding setting, or selecting a menu item.

The display controller 230 generates a message or the like to be sent to the trainee, a graphic image of a task game or the like in accordance with a display signal from the operation processing unit 200, and displays the generated message or image on the display panel 170. The display controller 230 according to this embodiment displays a message for alerting the trainee 900 that the posture during the training is not correct as a message to be sent to the trainee 900.

The memory 240, which is a non-volatile storage medium, may be, for example, a solid state drive. The memory 240 stores a control program etc. for controlling the training apparatus 100. The memory 240 further stores various parameter values, functions, lookup tables and the like to be used for control. The memory 240 stores, in particular, a task game 241, which is a program for giving a task in a form of a game so as to allow the trainee 900 to enjoy performing the trial of the training. The memory 240 stores results of the trial of the training in the storage area 242. The manager of the training apparatus 100 reads out the results of the training that have been stored, evaluates the attempted training, and uses the results of the training when it, makes a plan of the next training.

The load sensor 140 detects a load applied from the foot of the trainee 900 via the riding plate 130 and transmits the detection signal to the operation processing unit 200. In this embodiment, the four load sensors 140 that support the riding plate 130 transmit the loads in the vertical detection detected by the respective load sensors 140 to the operation processing unit 200 as the detection signals.

The driving unit 210 includes a driving circuit and a motor for driving the driving wheels 121. Further, the driving unit 210 includes a rotary encoder configured to detect the rotation amount of the driving wheels 121. The driving unit 210, which is a driving unit for driving the driving wheels 121, drives the driving wheels 121 in accordance with the driving signal generated by the movement controller. The driving unit 210 drives the driving wheels 121 so as to move the moving cart 110 at a predetermined speed or a predetermined acceleration or by a predetermined moving distance in accordance with, for example, the change in the center of gravity of the trainee 900.

Figure 3:
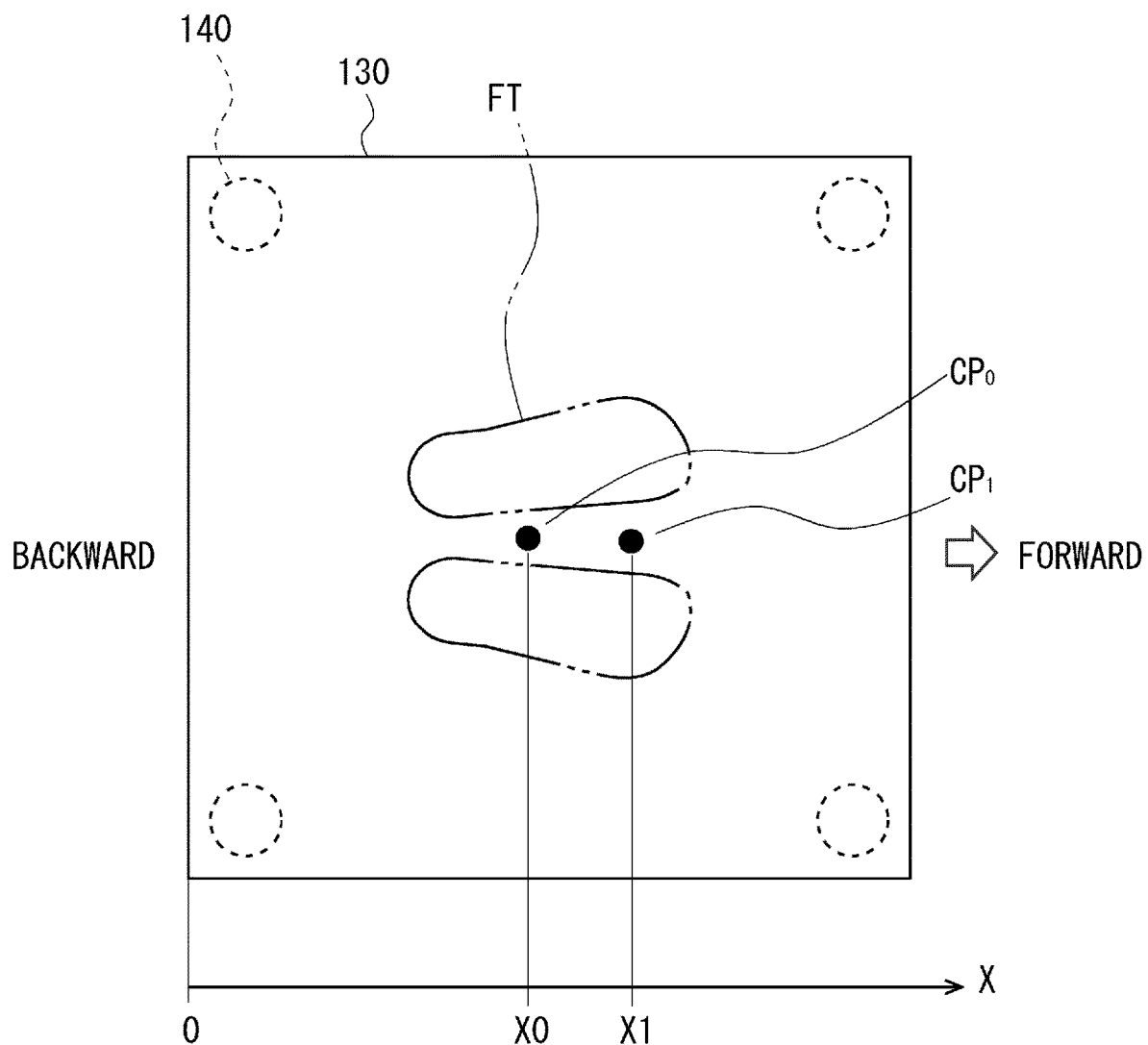
FIG. 3 is a diagram showing an example of positions of feet of a trainee and a first center of gravity on a riding plate.

Referring next to FIG. 3, the first center of gravity will be explained. FIG. 3 is a diagram showing, an example of the positions of the feet of the trainee and the first center of gravity in the riding plate. The rectangle shown in FIG. 3 shows a top view of the riding plate 130. The right side indicates the forward part of the training apparatus 100 and the left side indicates the backward part of the training apparatus 100. The circles shown by dotted lines at the four corners of the riding plate 130 are the load sensors 140 that support the riding plate 130. The soleprints shown by alternate long and two short dashes lines at the central part of the riding plate 130 show the trainee's right and left feet FT that contact the riding plate 130. When the trainee starts training, he/she contacts his/her soles in desired positions of the central part of the riding plate 130, and then performs training so as not to move the soles from the position where his/her soles contact the riding plate 130.

Of the two points shown between the right and left feet FT of the trainee, the one which is shown on the left side is an initial center of gravity $CP_0$ when the trainee stands still on the riding plate 130 at the time of the trial of the training. When the trainee starts training, he/she stands upright on the riding plate 130. The first center of gravity calculation unit 201 calculates the initial center of gravity $CP_0$, which is the centroid position of the trainee 900 who is in the static standing state, from the detection data of the four load sensors 140.

When the training is started, the trainee tries to move the center of gravity while keeping his/her sole contacted the riding plate 130. The point shown on the right side of the initial center of gravity $CP_0$ is an example of a first center of gravity $CP_1$, which is the centroid position of the trainee during the training. The example shown in FIG. 3 shows a state in which the trainee 900 has moved the center of gravity forward. Therefore, the first center of gravity $CP_1$ is located in the front of the initial center of gravity $CP_0$.

The X axis shown by an arrow in the lower side of the riding, plate 130 in FIG. 3 shows the position, of the center of gravity in the front-back direction when the end part of the riding plate 130 on the back side is set as a starting point. In the example shown in FIG. 3, the position of the initial center of gravity $CP_0$ is a position X0 and the position of the first center of gravity $CP_1$ is a position X1. The training apparatus 100 moves the moving cart 110 forward or backward in accordance with the difference between the initial center of gravity $CP_0$ and the first center of gravity $CP_1$.

Therefore, in the case of the example shown in FIG. 3, the moving cart 110 moves forward in accordance with the difference between the position X1 and the position X0. In this way, the training apparatus 100 moves the moving cart 110 forward. When the center of gravity of the trainee 900 is positioned in the rear of the initial center of gravity $CP_0$, the training apparatus 100 moves backward in accordance with the difference from the position. X0 of the initial center of gravity $CP_0$.

Figure 4:
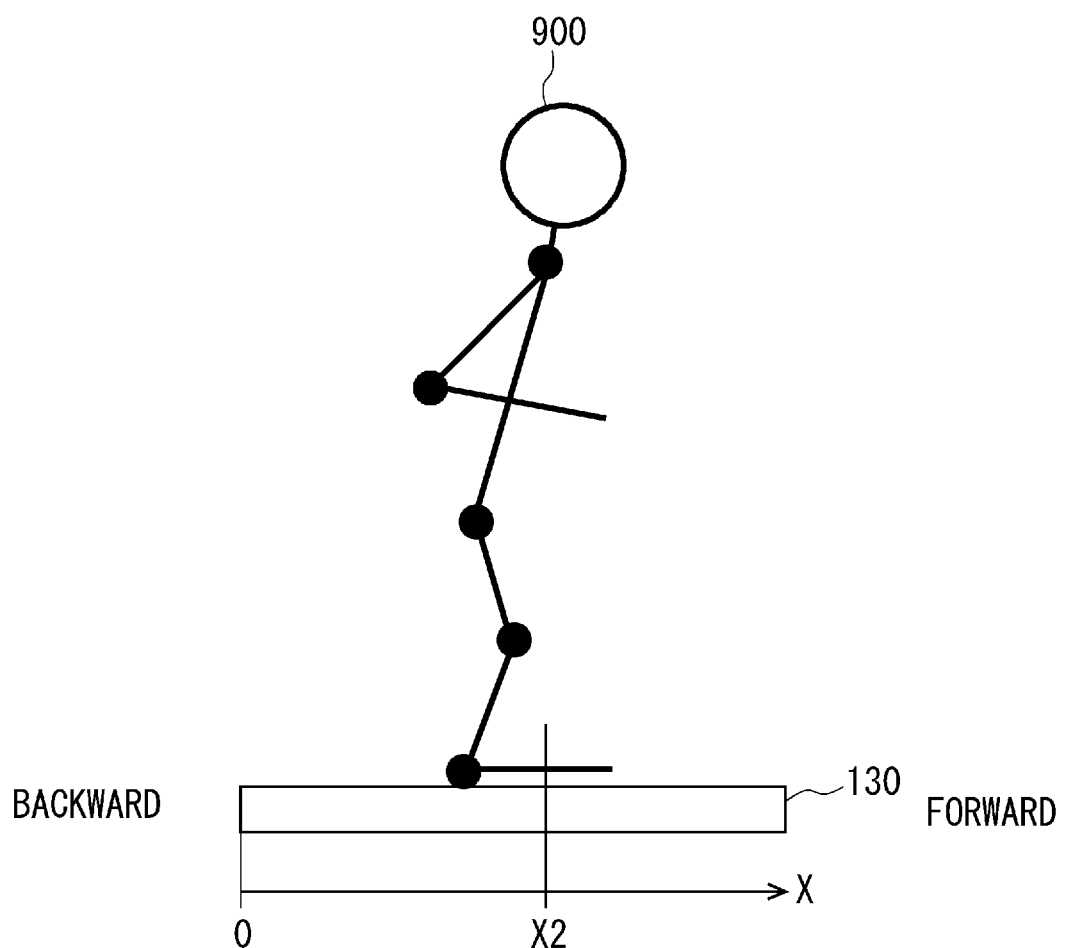
FIG. 4 is a diagram showing an example of a second center of gravity estimated from posture data.

Referring next to FIG. 4, the second center of gravity will be explained. FIG. 4 is a diagram showing an example of the second center of gravity estimated from the posture of the trainee. FIG. 4 shows the riding plate 130 and the posture of the trainee 900 from an image that the image-capturing unit 180 has captured the trainee and the moving cart 110 from the side. The right side of FIG. 4 shows the front side of the training apparatus 100 and the left side of FIG. 4 shows the back side of the training apparatus 100.

The image of the trainee 900 shown in FIG. 4 schematically shows the skeleton and the joint that have been estimated from the captured image data. In FIG. 4, the X axis for indicating the position of the center of gravity in the front-back direction when the end part of the riding plate 130 on the back side is set as a starting point is shown, similar to FIG. 3.

The line shown to cross the skeleton of the foot of the trainee 900 is the second center of gravity of the trainee 900 estimated by the second center of gravity estimation unit 202. The second center of gravity on the X axis is a position X2. When the difference between the position X2 estimated by the second center of gravity estimation unit 202 and the position X1 calculated by the first center of gravity calculation unit 201 is not large, it can be said that the trainee during the training performs training while putting his/her weight on the riding plate 130.

Figure 5:
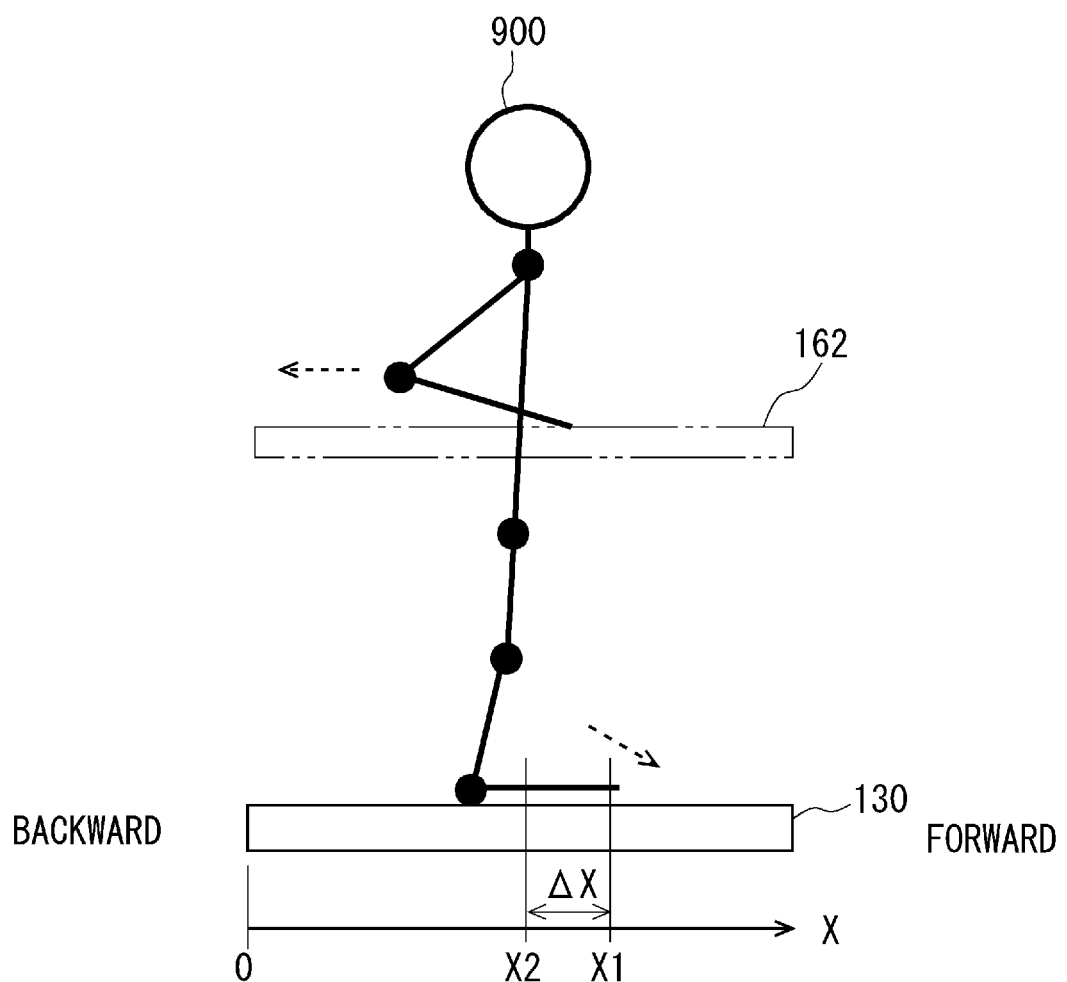
FIG. 5 is a diagram showing a first example in which there is a difference between the first center of gravity and the second center of gravity.
Figure 6:
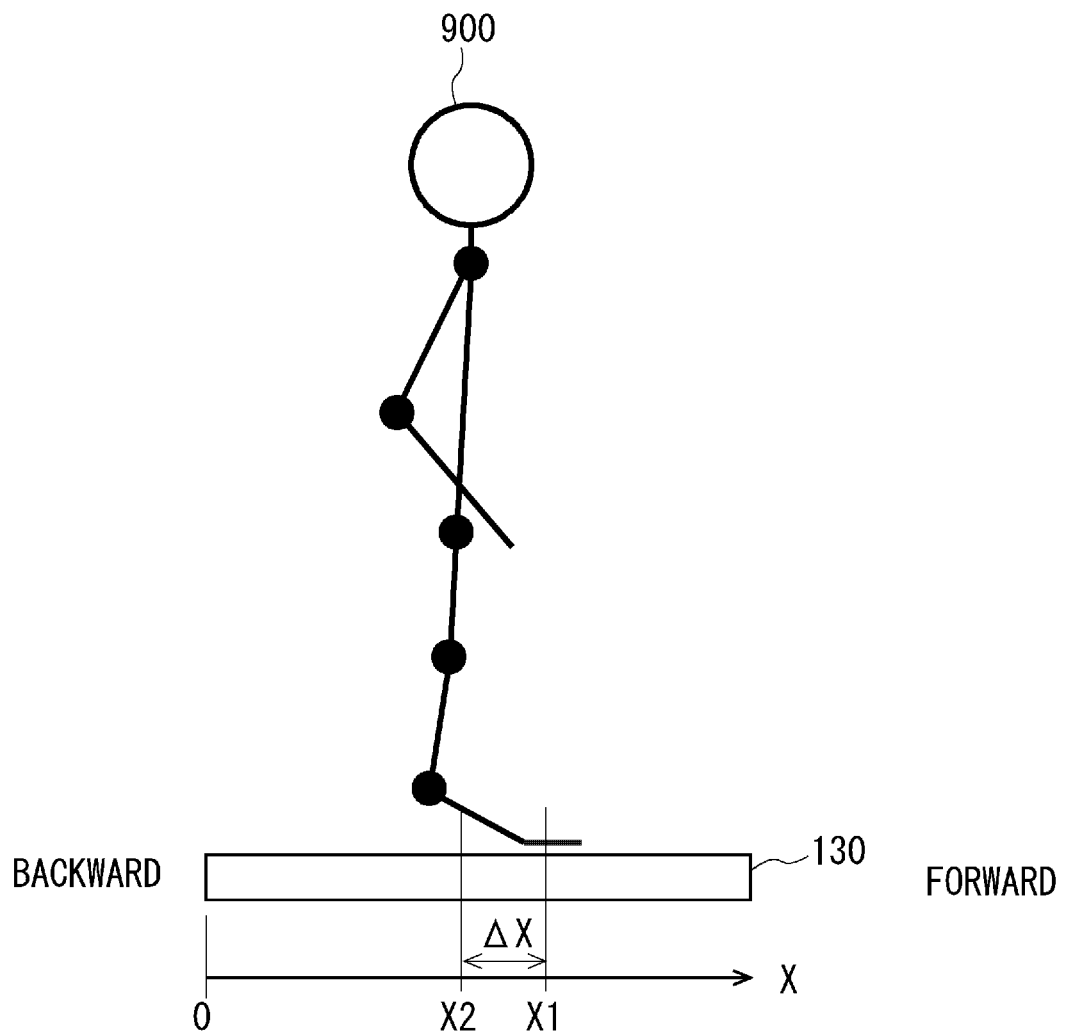
FIG. 6 is a diagram showing a second example in which there is a difference between the first center of gravity and the second center of gravity.

Referring next to FIGS. 5 and 6, a case in which the difference between the first center of gravity and the second center of gravity is large will be explained. FIG. 5 is a diagram showing a first example in which there is a difference between the first center of gravity and the second center of gravity. FIG. 5 shows a state in which the position X1 indicating the first center of gravity and the position X2 indicating the second center of gravity are overlapped with the image of the trainee 900 captured from the side. Further, in FIG. 5, the difference between the position X1 and the position X2 is shown by $\Delta X$.

The trainee 900 shown in FIG. 5 holds the handrail 162. Since the trainee 900 holds the handrail 162, the posture of the trainee 900 is close to an upright state. In reality, however, the trainee 900 inclines his/her upper limb toward the back side while pulling the handrail 162, whereas the center of gravity is moved toward his/her tiptoe in the sole.

In the above situation, the first center of gravity calculation unit 201 calculates the first center of gravity as the position X1 in the vicinity of the tiptoe of the trainee 900 from the detection signals of the load sensors. On the other hand, the second center of gravity estimated by the second center of gravity estimation unit 202 from, the image of the trainee 900 that the image-capturing unit 180 has captured is the position X2 that is close to the heel side of the trainee. In this way, since the trainee 900 puts his/her weight on the handrail 162, the value of $\Delta X$, which is the difference between the position X1 calculated by the first center of gravity calculation unit 201 and the position X2 estimated by the second center of gravity estimation unit 202, becomes large. This state is not a preferable state for recovering the ankle joint function of the trainee.

FIG. 6 is a diagram showing a second example in which there is a difference between the first center of gravity and the second center of gravity. The trainee 900 shown in FIG. 6 puts his/her weight on the tiptoe while slightly raising his/her heel. Therefore, the first center of gravity calculation unit 201 calculates the first center of gravity to be the position X1 in the vicinity of the tiptoe of the trainee 900. On the other hand, the posture of the trainee 900 captured by the image-capturing unit 180 is close to the upright state. In this case, it is possible that the second center of gravity estimation unit 202 may not be able to detect that the heel of the trainee 900 is raised. In this case, the second center of gravity estimated by the second center of gravity estimation unit 202 is the position X2 that is close to the heel side of the trainee. In this way, since the trainee 900 slightly raises his/her heel, $\Delta X$, which is the difference between the position X1 and the position X2, becomes large.

In addition to the examples shown in FIGS. 5 and 6, in a case in which the trainee 900 holds the handrail 162 and inclines his/her upper limb to the front side or in, a case in which the trainee 900 slightly lifts his/her tiptoe to apply his/her weight to the heel, ΔX may become large. In this embodiment, since the determination unit 203 calculates ΔX, when the cases illustrated in FIGS. 5 and 6 occur, the determination unit 203 alerts and encourages the trainee 900 to correct his/her posture.

Figure 7:
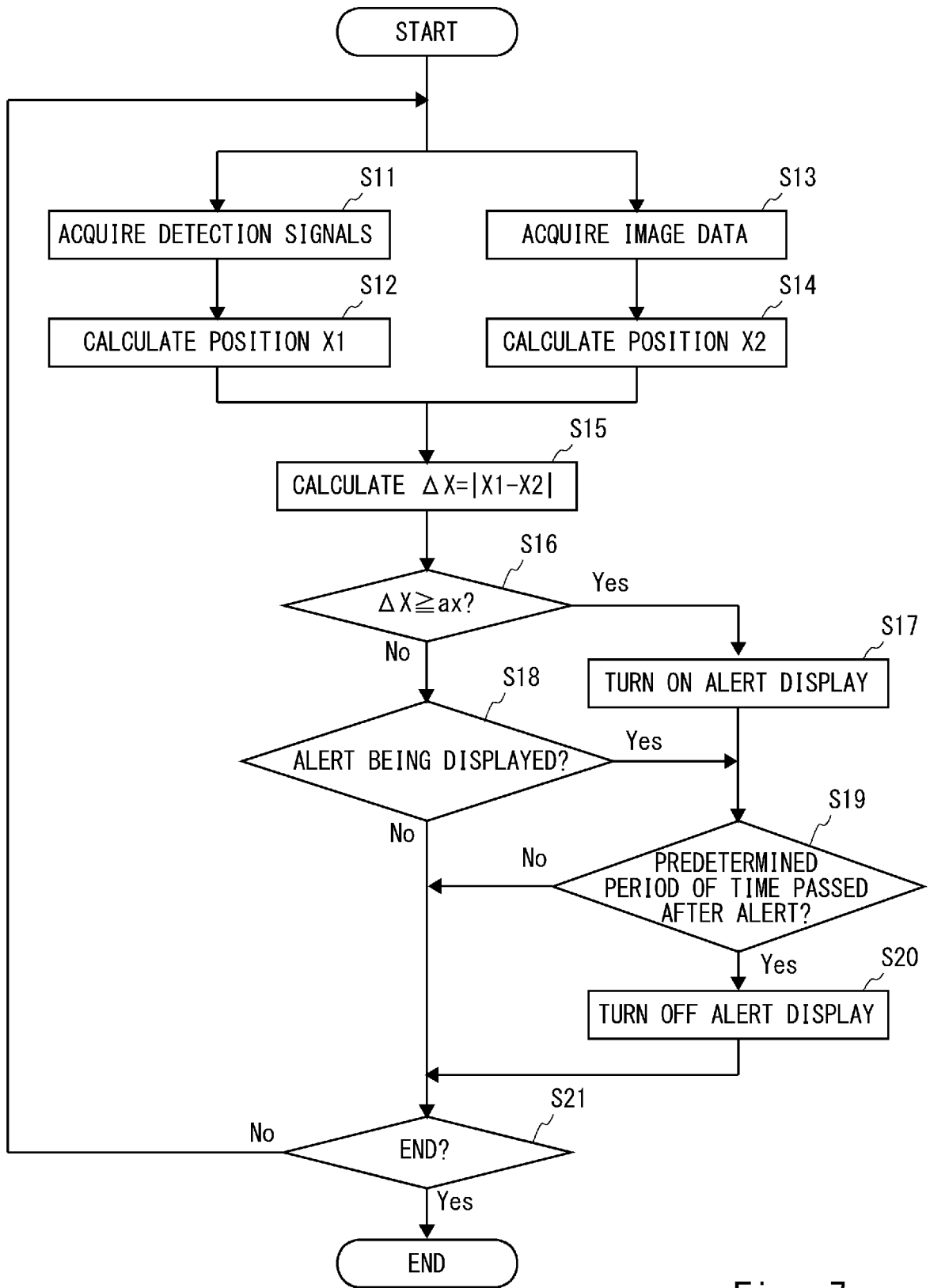
FIG. 7 is a flowchart showing processing of a balance training apparatus according to a first embodiment.

Referring next to FIG. 7, processing performed by the training apparatus 100 will be explained. FIG. 7 is a flowchart showing processing of the balance training apparatus according to the first embodiment. FIG. 7 shows processing performed by the operation processing unit 200.

First, the operation processing unit 200 acquires the detection signals from the load sensors 140 (Step S11). Next, the first center of gravity calculation unit 201 of the operation processing unit 200 calculates the position X1 of the first center of gravity from the acquired detection signal (Step S12).

Further, the operation processing unit 200 acquires image data from the image-capturing unit 180 in parallel to the aforementioned Steps S11 and S12 (Step S13). Then the second center of gravity estimation unit of the operation processing, unit 200 estimates the posture of the trainee from the acquired image data and calculates the position X2 of the second center of gravity from the posture of the trainee that has been estimated (Step S14).

Next, the determination, unit 203 calculates ΔX, which is the difference between the position X1 and the position X2 (Step S15). Further, the determination unit 203 compares the calculated ΔX with a predetermined threshold ax (Step S16). When ΔX is equal to or larger than the threshold ax (Step S16: Yes), the determination unit 203 determines that the alert to the trainee should be output.

Next, the operation processing unit 200 turns on the alert display to the trainee in accordance with the determination made by the determination unit 203 (Step S17). More specifically, the operation processing unit 200 instructs the display controller 230 to display an alert on the display panel 170. Accordingly, an alert such as "Please train with the correct posture" is displayed on the display panel 170.

After the alert display is turned on, the operation processing unit 200 determines whether a predetermined period of time has passed after the alert display (Step S19). When the predetermined period of time has passed (Step S19: Yes), the operation processing unit 200 turns off the alert display (Step S20) and the process then proceeds to Step S21. On the other hand, when the predetermined period of time has not passed after the alert (Step S19: No), the operation processing unit 200 goes to Step S21 without operating the alert display.

Next, the operation processing unit 200 determines whether to end a series of processing (Step S21). When it is determined that the series of processing should be ended (Step S21: Yes), the operation processing unit 200 ends the processing. On the other hand, when it is not determined that the series of processing should be ended (Step S21: No), the process goes back to the first step, where the operation processing unit 200 acquires the detection signal (Step S11) and acquires the image data (Step S13), and then the following series of processing is repeated.

The process goes bark to Step S16. When ΔX is not equal to or larger than, the threshold ax (Step S16: No), the determination unit 203 does not determine that the alert to the trainee should be output. In this case, the operation processing unit 200 determines whether the display panel 170 is now displaying the alert (Step S18), When the display panel 170 is now displaying the alert (Step S18: Yes), the process goes to Step S19, where the operation processing unit 200 determines whether a predetermined period of time has passed after the alert (Step S19). On the other hand, when the display panel 170 is not displaying the alert (Step S18: No), the operation processing unit 200 goes to Step S21.

When ΔX is equal to or larger titan the threshold ax as a result of the aforementioned processing, the operation processing unit 200 performs the alert display to the trainee for a predetermined period of time. Steps S11 and S12 may be performed in parallel to Steps S13 and S14, or Steps S11 and S12, and Steps S13 and S14 may be performed in this order.

Figure 8:
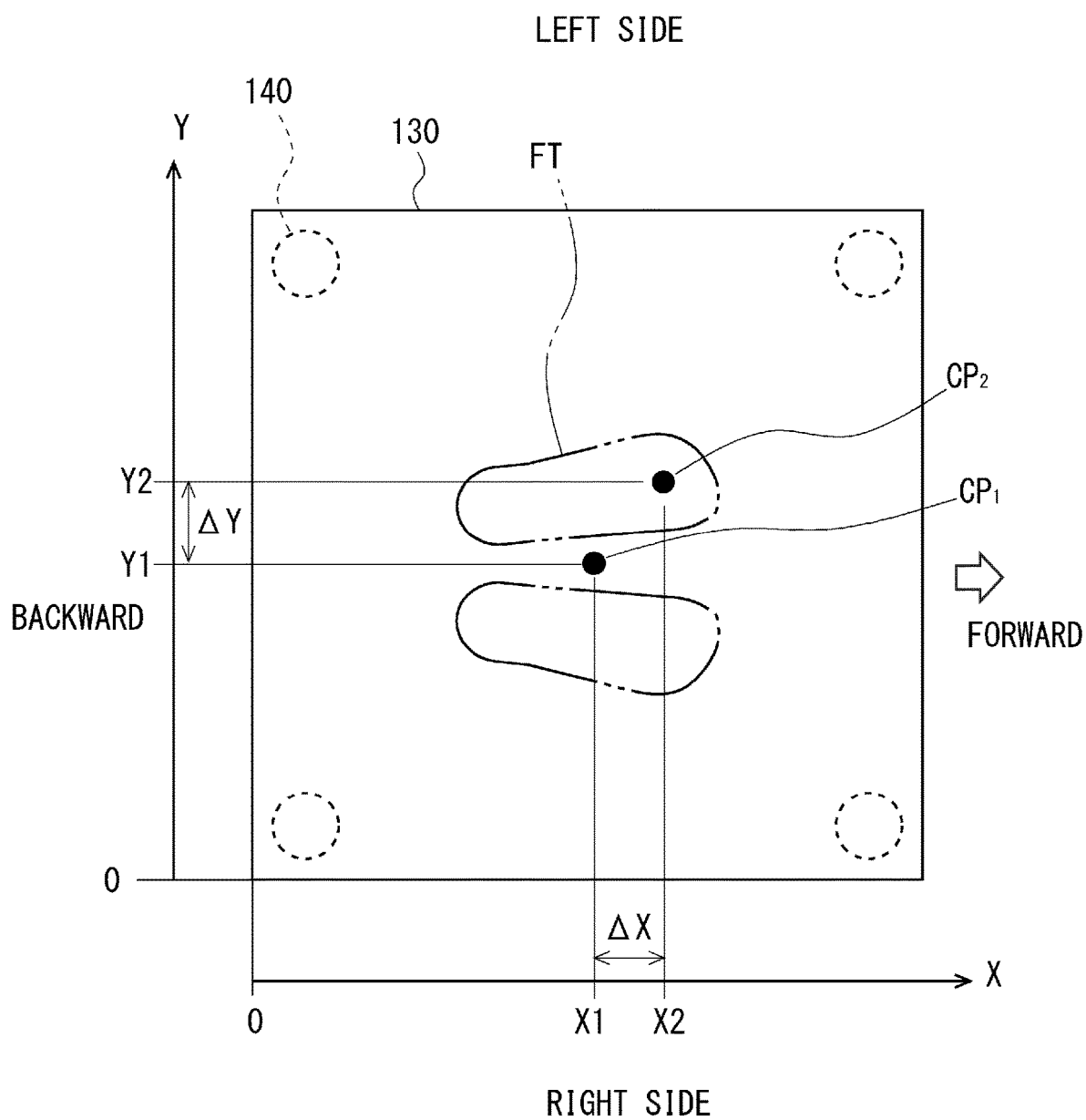
FIG. 8 is a diagram showing, an example of the center of gravity in a case in which the center of gravity in the right-left direction is detected.

The operation processing unit 200 may acquire the center of gravity of the moving cart 110 in the right-left direction in addition to the front-back direction to determine whether to alert the trainee. FIG. 8 is a diagram showing an example of the center of gravity in the case in which the center of gravity in the right left direction is detected. FIG. 8 is a diagram of the riding, plate 130 when it is seen from the top. The right side of FIG. 8 shows the front side of the training apparatus 100, the left side of FIG. 8 shows the back side of the training apparatus 100, the upper side of FIG. 8 shows the left side of the training apparatus 100, and the lower side of FIG. 8 shows the right side of the training apparatus 100. FIG. 8 shows the axis to indicate the position in the right-left direction in addition to the X axis shown to indicate the position in the front-back direction. The origin of the Y axis is the right end part of the riding plate 130. That is, the origin of the XV coordinates is an end part of the right back side of the riding plate 130.

FIG. 8 shows the first center of gravity $CP_1$ and the second center of gravity $CP_2$. The coordinates of the first center of gravity $CP_1$ are X1 and Y1. The coordinates of the second center of gravity $CP_2$ are X2 and Y2. In this case, it is ΔXY that the determination unit 203 calculates as the difference between the centroid positions, and ΔXY is calculated from the following expression (1).

$$\Delta XY = \sqrt{(\Delta X)^2 + (\Delta Y)^2} \quad (1)$$

As described above, by taking into account the difference in the center of gravity in the right-left direction, the training apparatus 100 is able to display the alert also when the trainee 900 puts his/her weight on the handrail 162 on one side.

Figure 9:
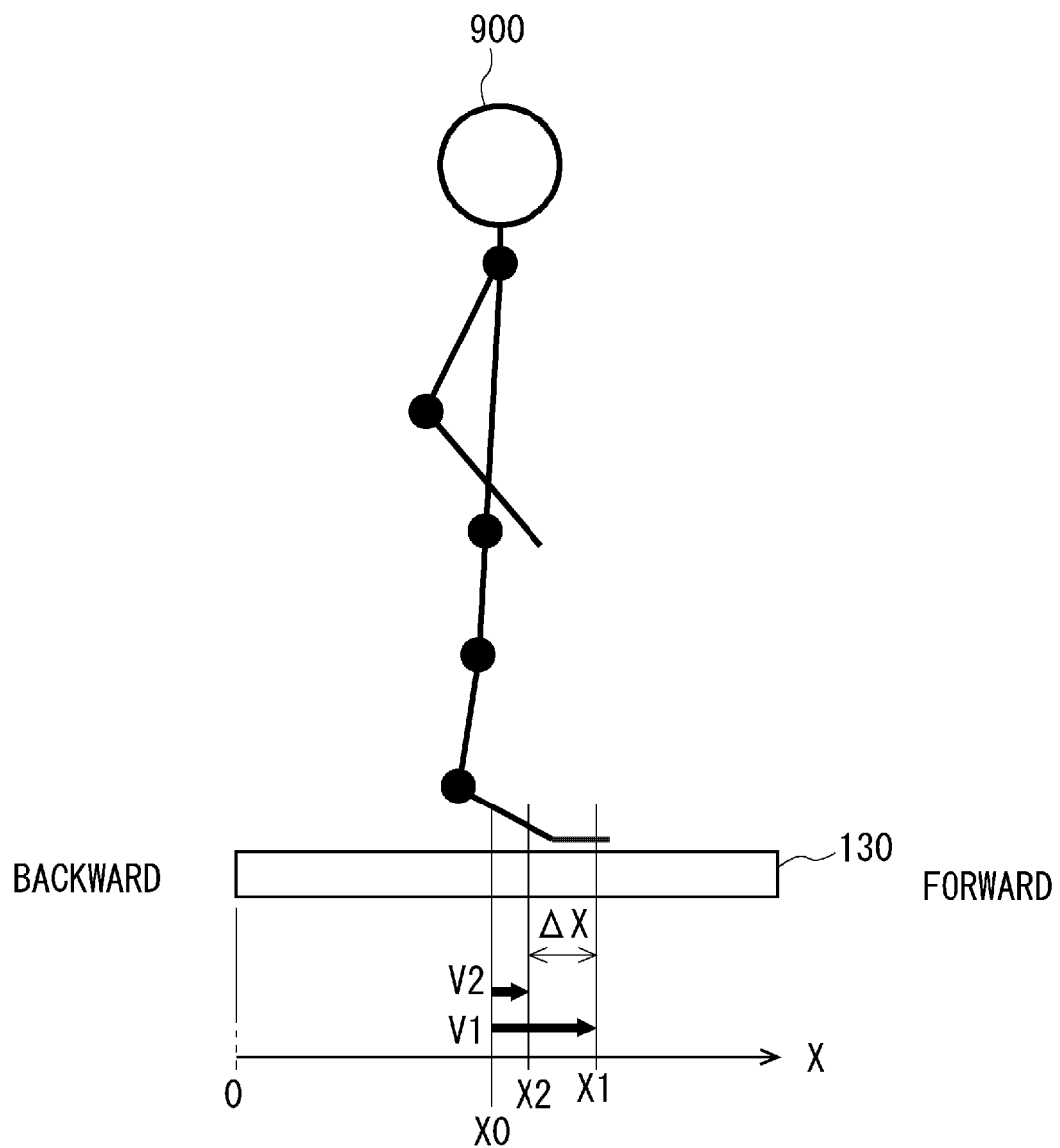
FIG. 9 is a diagram showing a difference between the first center of gravity and the second center of gravity with respect to an initial center of gravity.

Referring next to FIG. 9, processing of the movement controller will be explained. The movement controller 204 may adjust, when the difference between the first center of gravity and the second center of gravity is equal to or larger than the threshold ax, the speed, the acceleration, or the moving distance based on the difference between the first center of gravity and the second center of gravity. It is possible that the difference between the first center of gravity detected via the riding plate 130 and the second center of gravity estimated from the posture of the trainee captured by the image-capturing unit 180 becomes large when, for example, the trainee has his/her heel lifted. In this case, if the moving cart 110 is moved based on only the change in the first center of gravity, it is possible that the trainee loses his/her balance, which may cause the trial of the training to be interrupted.

FIG. 9 is a diagram showing a difference between the first center of gravity and the second center of gravity with respect to the initial center of gravity. FIG. 9 shows a state in which the trainee 900 has his/her heel lifted. FIG. 9 shows the position X0 of the initial center of gravity, the position X1 of the first center of gravity, and the position X2 of the second center of gravity.

The position X0 is located in a part that is close to the heel of the trainee 900. The position X1 of the first center of gravity is located in a position that is close to the tiptoe of the trainee 900 since the trainee 900 has his/her heel lifted. The position X2 of the second center of gravity is located between the position X0 and the position X1. Further, the example shown in FIG. 9 is a case in which ΔX is equal to or larger than the threshold ax.

In the aforementioned situation, the movement controller 204 calculates the average between the difference V1 and the difference V2 from the difference V1, which is the difference between the position X0 and the position X1, and the difference V2, which is the difference between the position X0 and the position X2. Then the movement controller 204 corrects the driving signal for the driving unit 210 in such a way that the centroid position of the trainee 900 is located at a position that corresponds to the average value between the difference V1 and the difference V2. Since the movement controller 204 includes the aforementioned function, the training apparatus 100 is able to perform an operation with less feeling of strangeness for the trainee. The aforementioned average value includes a weighted average.

Referring next to FIG. 10, an example of the training data acquired by the training apparatus 100 will be explained. FIG. 10 is a diagram showing an example of the training data generated by the training in the training apparatus 100. The training apparatus 100 executes the task game 241, whereby the trial of the training of about, for example, 10 minutes is performed. Then the training apparatus 100 stores the storage data of the attempted training in the storage area 242.

A table 300 shown in FIG. 10 is an example of the training data. The four-digit numbers shown such as "0021", "0022", "0023" in the leftmost column of the table 300 indicate IDs uniquely given to the respective stored training data items. The column right next to the IDs shows the date and time when the execution of the training has been started. The column right next to the date and time when the execution of the training has been started shows a task number, which is the number of the task game used in the training. The column right next to the task number stores which evaluation has been made as a result of the execution of the task game. The evaluation is shown, for example, by three stages. The best result is indicated by "A" and the worst result is indicated by "C".

A column 301 right next to the evaluation shows a flag indicating whether the alert has been displayed. When the alert has been displayed during the training, "1" is shown. On the other hand, when the alert has not been displayed, "0" is shown.

A row 302 of the table 300 is the training data whose ID is stored as "0022". The task number of the training, data of ID 0022 is 023, and the evaluation is A. However, the flag indicating that the alert has been displayed shows "1". That is, ID 0022 is the training data for which the alert has been displayed during the training. In this way, since the information indicating that the alert has been displayed is included in the training data, the manager of the training apparatus 100 that uses the training data is able to easily distinguish the training data for which the alert has been displayed from the training data for which the alert has not been displayed and it is possible to improve the accuracy of the evaluation. Therefore, the training apparatus 100 is able to provide the training data that can be efficiently used. The training apparatus 100 may not store the training data for which the alert has been displayed and may store only the training data for which the alert has not been displayed as available data. In the aforementioned example, the flag indicating that the alert has been displayed may be set to be "1" when the alert has been displayed a plurality of times.

The first embodiment has been described above. The configuration of the training apparatus 100 according to the first embodiment is not limited to the aforementioned one. For example, the means for outputting the alert may alert the trainee by a sound, vibration, light or the like in place of the display via the display panel 170 or in addition to the display via the display panel 170.

The image-capturing unit 180 may be the one that captures a 2D image in place of the measurement sensor. In this case, the operation processing unit 200 includes a function of estimating the skeleton or the joint of the trainee from the 2D image data. The operation processing unit 200 may include, for example, training data learned in advance by machine learning, to thereby estimate the posture of the trainee.

With the aforementioned configuration, according to the first embodiment, it is possible to provide the balance training apparatus and the like capable of providing efficient training.

Second Embodiment

Next, a second embodiment will be explained. A training, apparatus according to the second embodiment is different from the training apparatus according to the first embodiment in that the operation processing unit 200 includes an angle detection unit 205.

Figure 11:
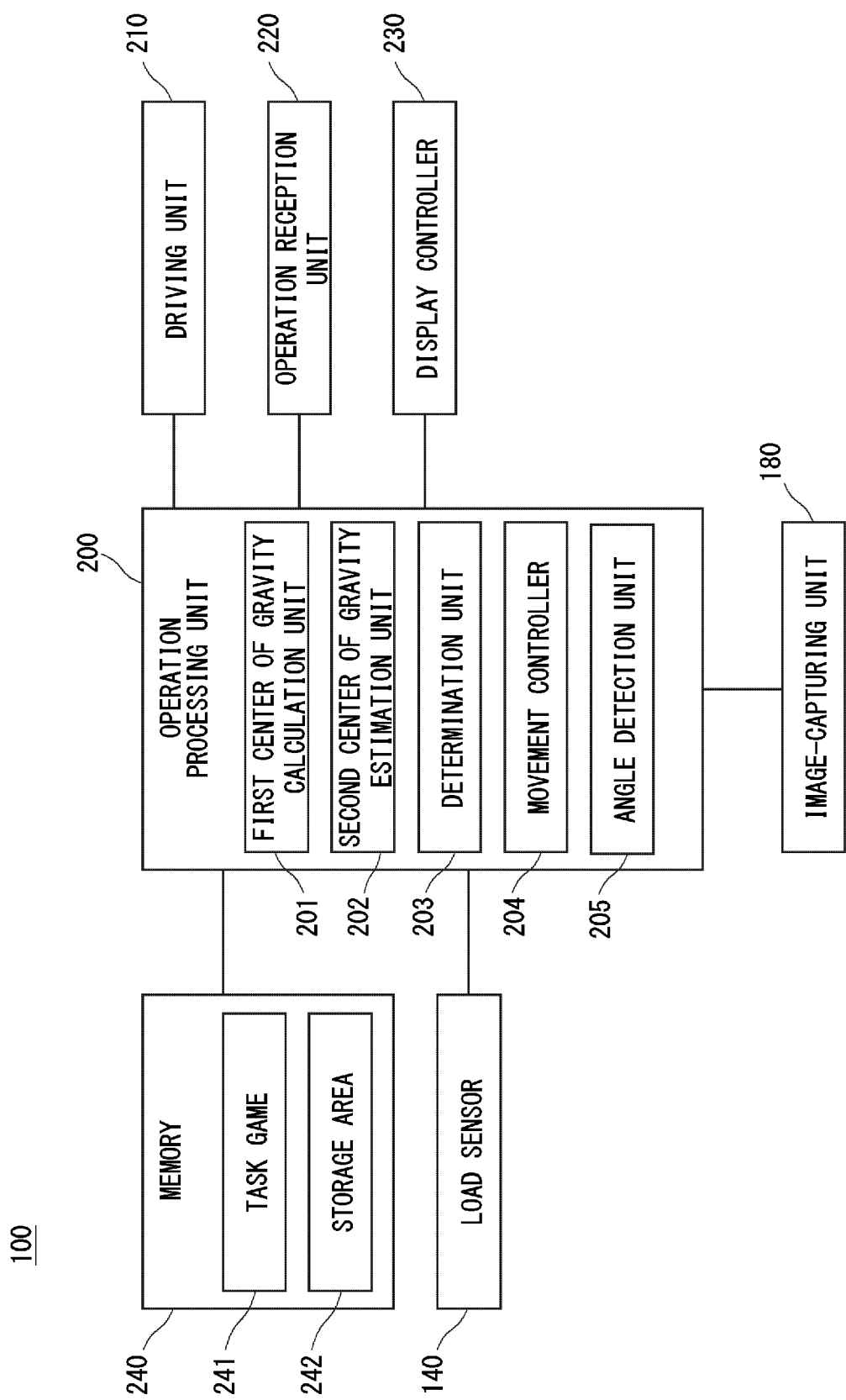
FIG. 11 is a diagram showing a system configuration of a balance training apparatus according to a second embodiment.

FIG. 11 is a diagram showing a system configuration of the training apparatus 100 according to the second embodiment. The training apparatus 100 shown in FIG. 11 includes the angle detection unit 205 in the operation processing unit 200. The angle detection unit 205 detects an angle between the sole of the trainee and the placement surface of the riding plate 130 from the image data acquired by the image-capturing unit 180. The angle detection unit 205 supplies the detected angle to the determination unit 203.

Figure 12:
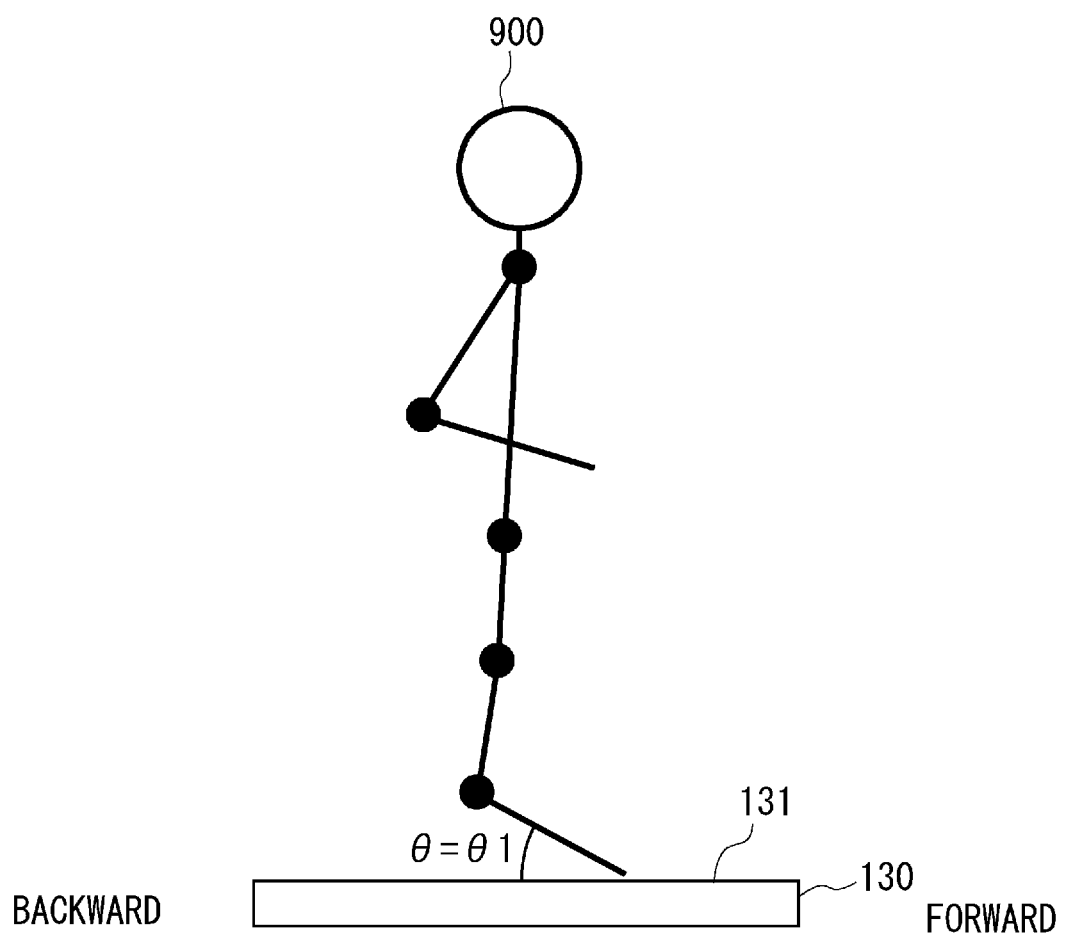
FIG. 12 is a diagram showing a first example of an angle of a sole in the posture data.
Figure 13:
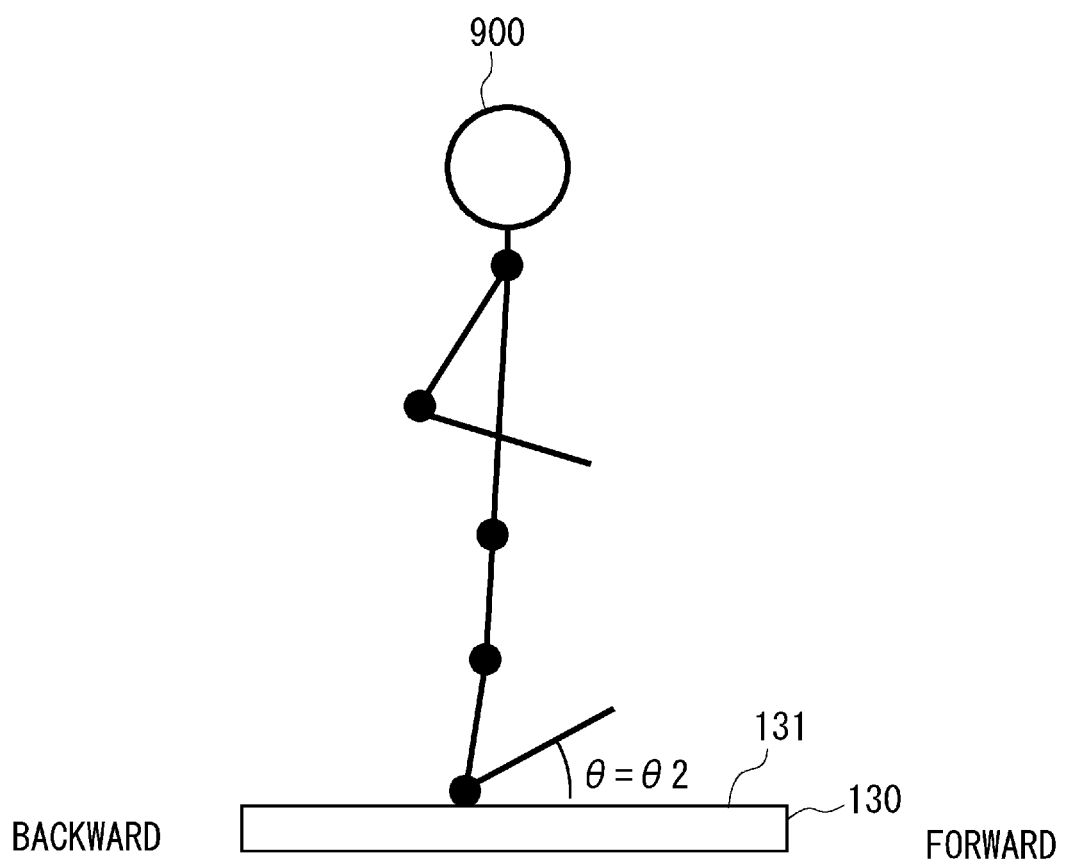
FIG. 13 is a diagram showing a second example of the angle of the sole in the posture data.

Referring now to FIGS. 12 and 13, the angle of the sole detected by the angle detection unit 205 will be explained. FIG. 12 is a diagram showing a first example of the angle of the sole. The trainee 900 shown in FIG. 12 stands on the placement surface 131 of the riding plate 130. The trainee 900 who stands on the placement surface 131 raises his/her heel. The angle between the sole of the trainee 900 and the placement surface 131 is θ=θ1.

FIG. 13 is a diagram showing, a second example of the angle of the sole. The trainee 900 shown in FIG. 13 raises his/her tiptoe. The angle between the sole of the trainee 900 and the placement surface 131 is θ=θ2.

Figure 14:
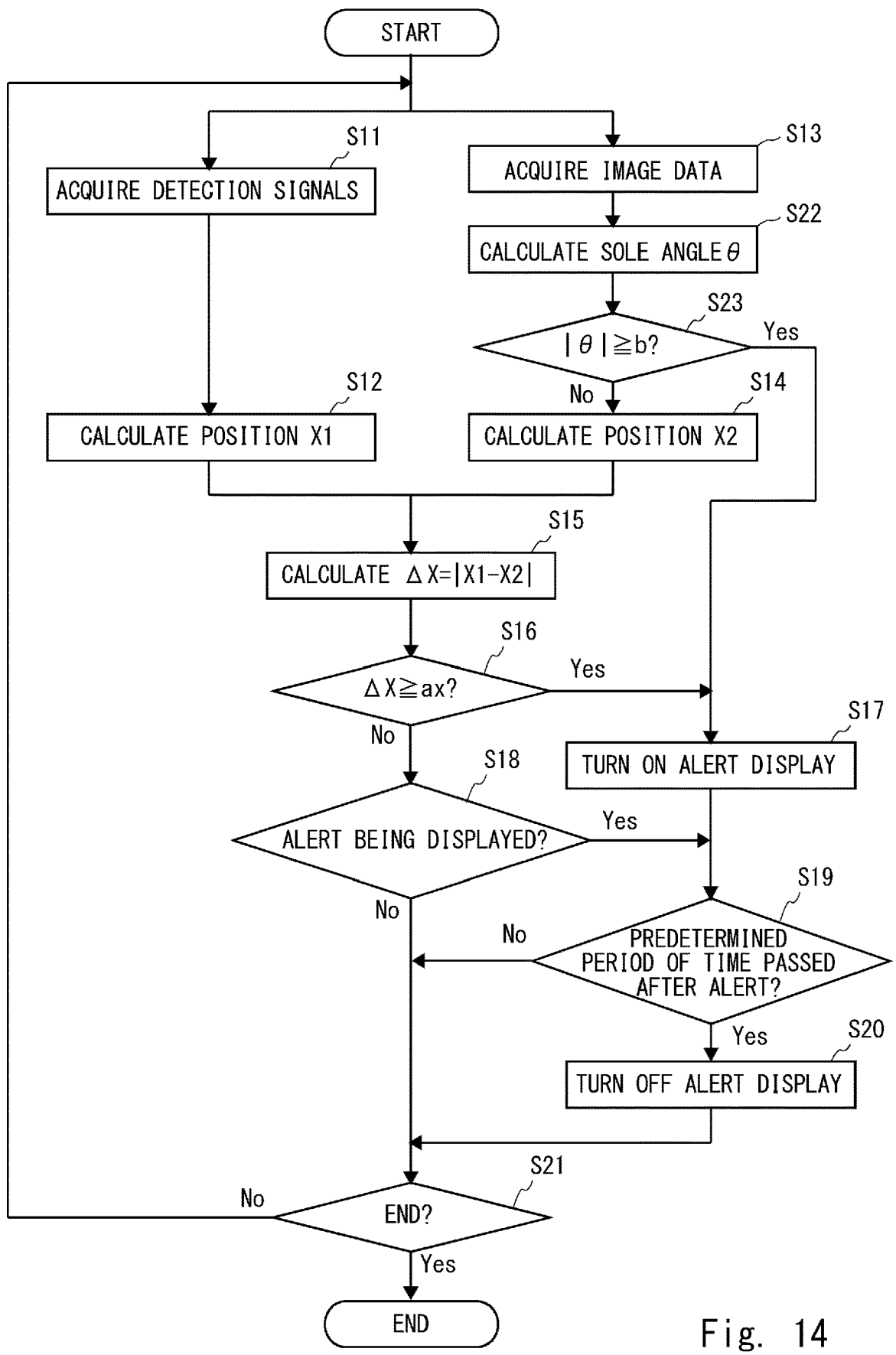
FIG. 14 is a flowchart showing processing of a training apparatus according to the second embodiment.

Referring next to FIG. 14, processing of the training apparatus 100 according to the second embodiment will be explained. FIG. 14 is a flowchart showing processing of the balance training apparatus according to the second embodiment. The flowchart shown in FIG. 14 is different from the flowchart shown in the first embodiment in that Steps S22 and S23 are provided between Step S13 and Step S14. In the following description, processing different from that, in the first embodiment will be explained.

In Step S13, the operation processing unit 200 acquires image data from the image-capturing unit 180. Next, the angle detection unit 205 calculate the angle θ between the sole and the placement surface 131 (Step S22). The angle detection unit 205 supplies information regarding the calculated angle θ to the determination unit 203.

Next, the determination unit 203 compares the information regarding the angle θ received from the angle detection unit 205 with a predetermined threshold b (Step S23). When the absolute value of the angle θ is equal to or larger than the threshold b (Step S23: Yes), the determination unit 203 determines that the alert to the trainee should be output, and then the process goes to Step S17. On the other hand, when the absolute value of the angle θ is not equal to or larger than the threshold b (Step S23: No), the determination unit 203 does not determine that the alert to the trainee should be output, and the process goes to Step S14. Then, in Step S14, the second center of gravity estimation unit 202 estimates the position X2. The second center of gravity estimation unit 202 estimates the posture of the trainee from the acquired image data and calculates the position X2 of the second center of gravity from the posture of the trainee that has been estimated (Step S14).

The second embodiment has been described above. The training apparatus 100 according to the second embodiment has the aforementioned configuration, whereby it is possible to determine that the alert, should be displayed from the angle between the sole and the placement surface regardless of the value of ΔX. Therefore, according to the second embodiment, it is possible to provide the balance training apparatus and the like capable of providing efficient training.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical, magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A balance training system comprising:
    a riding plate having a placement surface configured to support a sole of a trainee who is standing;
    a load sensor configured to detect a load that the riding plate receives from the trainee;
    a center of gravity calculation unit configured to calculate a first center of gravity, which is a centroid position of the load, based on the load detected by the load sensor;
    an image-capturing unit configured to acquire image data of an image including a posture of the trainee;
    a center of gravity estimation unit configured to estimate a second center of gravity, which is a centroid position of the trainee, based on the image data; and
    a determination unit configured to determine that an alert to the trainee should be output based on a difference between the first center of gravity and the second center of gravity.

2. The balance training system according to claim 1, further comprising a display unit and a display controller, wherein the display unit is installed whereby it is configured to be visually seen by the trainee, and
    wherein the display controller causes the display unit to display a message to alert the trainee.

3. The balance training system according to claim 1, further comprising an angle detection unit configured to detect an angle between the sole of the trainee and the placement surface from the posture of the trainee,
    wherein the determination unit determines that the alert should be output when the angle is larger than a predetermined threshold regardless of the difference between the first center of gravity and the second center of gravity.

4. The balance training system according to claim 1, further comprising:
    a driving unit configured to drive the riding plate at a predetermined speed, an acceleration, or a moving distance in accordance with a change in the first center of gravity; and
    a movement controller configured to control the driving unit,
    wherein the movement controller adjusts the predetermined speed, the acceleration, or the moving distance based on the difference between the first center of gravity and the second center of gravity.

5. The balance training system according to claim 4, further comprising a moving cart capable of moving on a moving surface by driving the driving unit,
    wherein the riding plate is placed on the moving cart.

6. The balance training system according to claim 1, further comprising a storage unit configured to store results of training performed by the trainee using the balance training system,
    wherein the storage unit includes data regarding whether the alert has been output in the results of the training.

7. The balance training system according to claim 1, further comprising a storage unit configured to store results of training performed by the trainee using the balance training system,
    wherein the storage unit records the results of the training when the alert has not been output during the training.

8. A method of controlling a balance training system for allowing a trainee standing on a riding plate to perform balance training, the method comprising:
    a detection step for detecting a load that the riding plate receives from the trainee;
    a center of gravity calculation step for calculating a first center of gravity, which is a center of gravity of the load, based on the detected load;
    an image-capturing step for acquiring image data of an image including a posture of the trainee;
    a center of gravity estimation step for estimating a second center of gravity, which is a center of gravity of the trainee, based on the image data; and
    a determination step for determining that an alert to the trainee should be output based on a difference between the first center of gravity and the second center of gravity.

9. A computer readable non-transitory storage medium storing a program for executing a method of controlling a balance training system for allowing a trainee standing on a riding plate to perform balance training, wherein the method comprises:
- a detection step for detecting a load that the riding plate receives from the trainee;
- a center of gravity calculation step for calculating a first center of gravity, which is a center of gravity of the load, based on the detected load;
- an image-capturing step for acquiring image data of an image including a posture of the trainee;
- a center of gravity estimation step for estimating a second center of gravity, which is a center of gravity of the trainee, based on the image data; and
- a determination step for determining that an alert to the trainee should be output based on a difference between the first center of gravity and the second center of gravity.

* * * * *